United States Patent [19]

Kudor

[11] 4,312,031
[45] Jan. 19, 1982

[54] APPARATUS FOR CONTROLLING CURRENT TYPE INVERTERS

[75] Inventor: Toshiaki Kudor, Inagi, Japan

[73] Assignee: Tokyo Shibaura Denki Kabushiki Kaisha, Kawasaki, Japan

[21] Appl. No.: 97,669

[22] Filed: Nov. 27, 1979

[30] Foreign Application Priority Data

Dec. 6, 1978 [JP] Japan .................. 53-150703

[51] Int. Cl.³ .................................... H02M 7/155
[52] U.S. Cl. ............................ 363/41; 318/811; 363/138
[58] Field of Search .................... 363/41-43, 363/96, 137, 138, 37; 318/802, 811, 729; 307/252 M

[56] References Cited

U.S. PATENT DOCUMENTS

| | | | |
|---|---|---|---|
| 3,694,718 | 9/1972 | Graf et al. | 363/137 |
| 3,886,430 | 5/1975 | Meier | 363/41 |
| 4,225,912 | 9/1980 | Messer | 363/96 |
| 4,227,138 | 10/1980 | Espelage | 318/802 |

FOREIGN PATENT DOCUMENTS

| | | | |
|---|---|---|---|
| 2704533 | 8/1978 | Fed. Rep. of Germany | 318/811 |
| 1040244 | 8/1966 | United Kingdom | 363/41 |

Primary Examiner—William H. Beha, Jr.
Attorney, Agent, or Firm—Stevens, Davis, Miller & Mosher

[57] ABSTRACT

In an apparatus for controlling an inverter which delivers a current vector with a specific number of phase positions to an AC load, there are provided a phase difference detecting circuit and a commutation control circuit. The phase difference detecting circuit detects a phase difference ($\theta$) between the output current vector delivered from the inverter and a phase angle instructed, while the commutation control circuit controls the commutation of the inverter by comparing the phase difference ($\theta$) thus detected, or an integration of the phase difference ($\theta$) with respect to time, with a positive reference value and a negative reference value.

8 Claims, 16 Drawing Figures

FIG. I
PRIOR ART
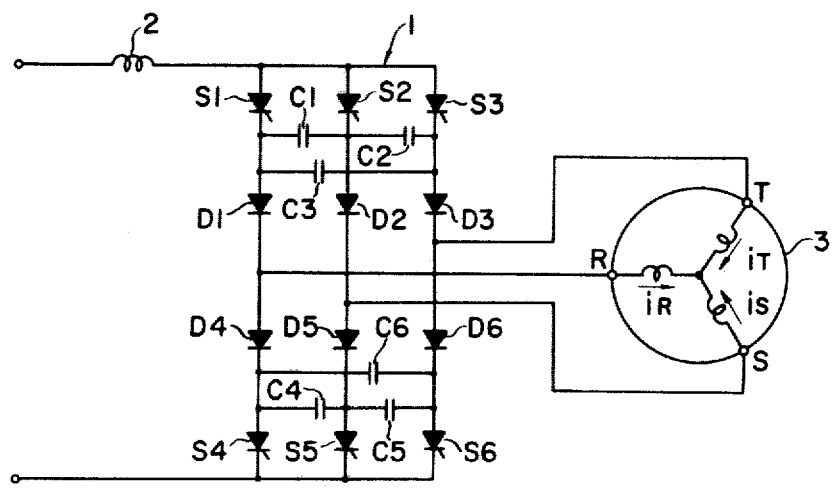
FIG. 2
PRIOR ART
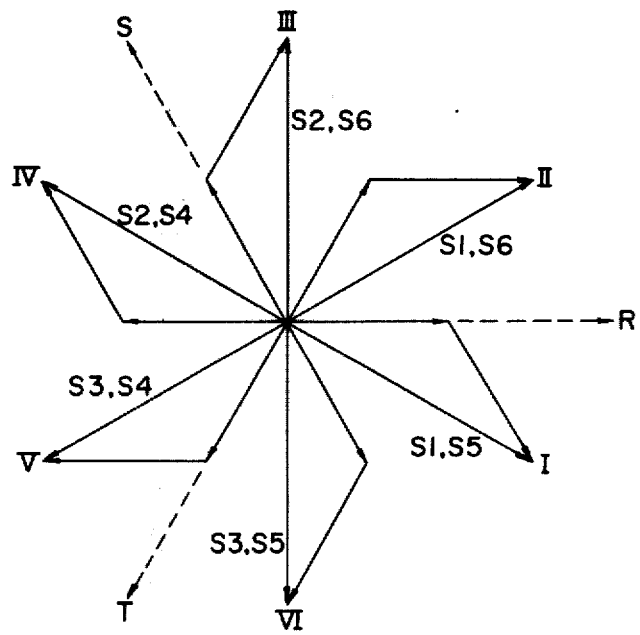

F I G. 14
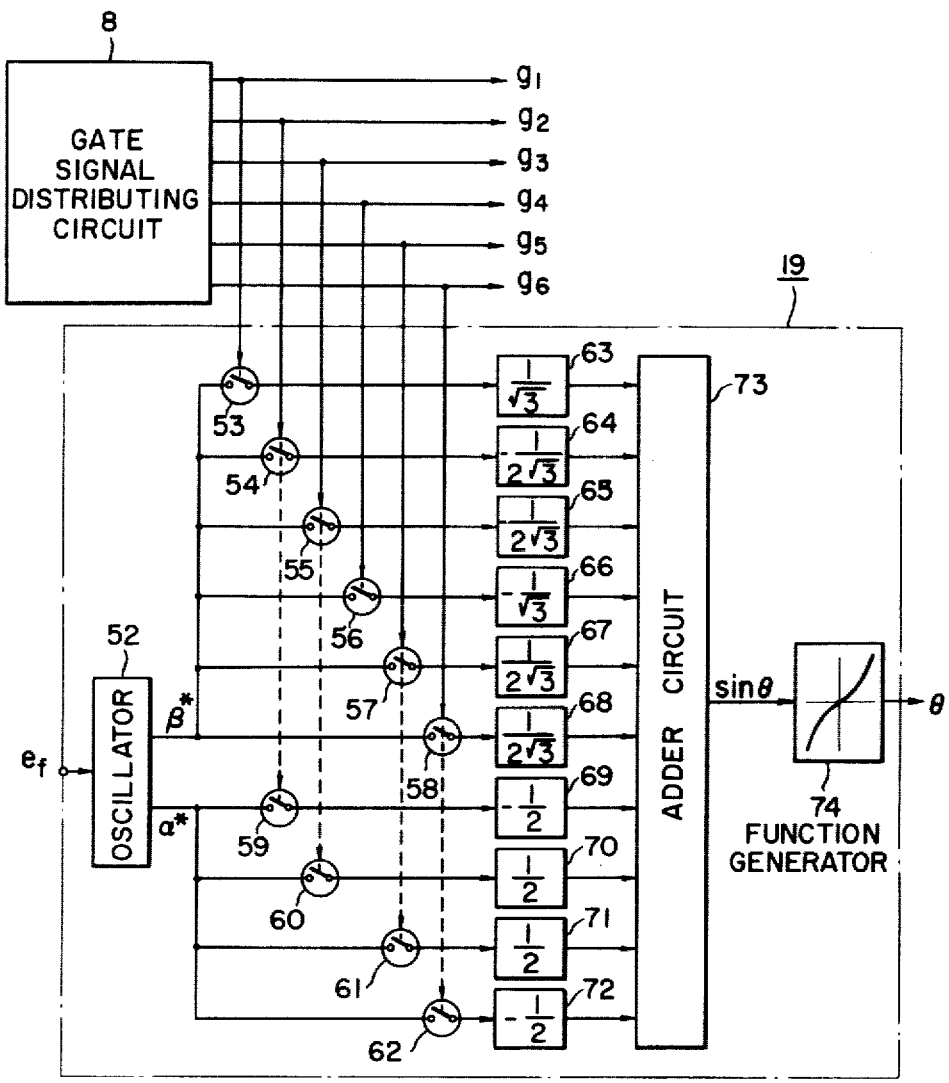

APPARATUS FOR CONTROLLING CURRENT TYPE INVERTERS

BACKGROUND OF THE INVENTION

This invention relates to apparatus for controlling a current type inverter adapted to drive an AC motor at variable speed, and more particularly to a controlling apparatus for controlling the output current vector of the current type inverter.

A well known construction of a current type inverter for controlling the operation of an AC motor is shown in FIG. 1. The inverter of the conventional construction converts DC current passing through a smoothing reactor 2 into three-phase AC current, which is supplied to the three phase windings R, S, and T of an AC motor 3. The inverter 1 comprises thyristors $S_1$ through $S_6$, diodes $D_1$ through $D_6$, and commutating capacitors $C_1$ through $C_6$, and is ordinarily controlled such that either one of the thyristors $S_1$ to $S_3$, and either one of the thyristors $S_4$ to $S_6$ are rendered conductive simultaneously. The vector of the current supplied from the inverter 1 to the AC motor 3 can occupy only six positions from I to VI as shown in FIG. 2.

In FIG. 2, the R phase winding of the AC motor 3 is taken as a reference axis. In a case where the thyristors $S_1$ and $S_5$ conduct, electric currents flow through the R and S phase windings of the electric motor 3. Since the R, S, and T phase windings of the same motor are spaced apart by an electric angle of 120°, the vector position of the synthesized current of the R phase and S phase currents is represented by I. Likewise, the vector positions of the synthesized currents flowing through other consecutive pairs of the phase windings are represented by II to VI, respectively.

In FIG. 3, there is illustrated a well known frequency controlling circuit of the inverter wherein each thyristor conducts for an electrical angle of 120°. In this circuit, a reference numeral 4 designates a voltage-frequency converter which delivers a series of pulses $P_f$, the frequency of which is varied in response to the magnitude of an input signal $e_f$, and a reference numeral 5 designates a comparator which detects the polarity of the input signal $e_f$. When the input signal $e_f$ is positive, the comparator 5 delivers an output $e_p$ in a "1" level, and when the input signal $e_f$ is negative, the comparator 5 delivers an output $e_p$ in a "0" level. The series of pulses $P_f$ generated from the voltage-frequency converter 4 are transferred by a transfer switch 6 controlled by the output $e_p$ of the comparator 5, so that the series of pulses $P_f$ are applied to up-input $P_u$ of a senary up-down counter 7 when the input signal $e_f$ is positive, and the same pulses $P_f$ are applied to down-input $P_D$ of the same counter 7 when the input signal $e_f$ is negative. The senary up-down counter 7 has six output positions $e_I$ through $e_{VI}$, which are sequentially turned to "1" in an order of from $e_I$ to $e_{VI}$ when the output pulses $P_f$ are applied to the up-input $P_u$ of the counter 7. Conversely, when the pulses $P_f$ are applied to the down-input $P_D$, one of the outputs $e_I$ through $e_{VI}$ becomes "1" sequentially in the order of from $e_{VI}$ to $e_I$.

Reference numeral 8 designates a gate signal distributing circuit which delivers gate signals $g_1$ through $g_6$ to be applied to the thyristors $S_1$ through $S_6$. When two of the gate signals $g_1$ through $g_6$ selectively are turned to "1", two of the thyristors $S_1$ through $S_6$ (in FIG. 1) corresponding thereto are made conductive. The gate signal distributing circuit 8 may be preferably composed of six OR gates 81 through 86, and by such a construction, the output signals $e_I$ through $e_{VI}$ of the up-down counter 7 are caused to respectively correspond to the vector positions I through VI of the current to be supplied to the AC motor 3 as shown in FIG. 2.

FIG. 4 indicates a time chart for the operation of the device shown in FIG. 3 when a frequency control input signal $e_f$ of a positive constant value is applied thereto. A series of pulses $P_f$ delivered from the voltage-frequency converter 4 and having a frequency corresponding to the magnitude of the input signal $e_f$, are controlled by the output $e_p$ of the comparator 5 delivered in response to the polarity of the input signal $e_f$, such that the pulses $P_f$ are applied to the up-input $P_u$ or the down-input $P_D$ of the up-down counter 7 depending upon the polarity of the input signal $e_f$. Each time when an up-pulse $P_u$ is applied, the up-down counter 7 shifts the position of the output "1" in the sequence of $e_I \rightarrow e_{II} \rightarrow \ldots e_{VI} \rightarrow e_I$.

According to the output condition of the up-down counter 7, the gate signal distributing circuit 8 selects the thyristors to be ignited, and the current vector supplied to the electric motor 3 is thereby stepwisely shifted in the sequence of $I \rightarrow II \rightarrow \ldots VI \rightarrow I$ as shown in FIG. 2. This stepwise shift of the current vector is effectuated by the commutation of the inverter 1 in accordance with the timing by which the output signals of the up-down counter 7 and the gate signal distributing circuit 8 are varied by the output pulses $P_f$ of the voltage-frequency converter 4.

In a case where the input signal $e_f$ representing the frequency information is of a negative polarity, the output pulses $P_f$ of the voltage-frequency converter 4 are applied to the down-input $P_D$ of the up-down counter 7, and therefore the output signal "1" of the up-down counter 7 is shifted in the sequence of $e_{VI} \rightarrow e_V \rightarrow \ldots \rightarrow e_I \rightarrow e_{VI}$. The current vector shown in FIG. 2 is thus rotated in the direction of $VI \rightarrow V \rightarrow \ldots \rightarrow I \rightarrow VI$. Since the rotation fo current vector completes after six stepwise shifts, the one cycle period of the output pulses $P_f$ of the voltage-frequency converter 4 corresponds to 60°.

In the above described conventional arrangement where each of the thyristors conducts for 120° continuously, the current vector supplied to the AC motor 3 is rotated stepwisely. Thus, a torque-ripple having a frequency proportional to the running speed of the AC motor is created in the torque of the same motor.

Although the torque-ripple causes no problem when the running speed is high, the one cycle period thereof becomes longer when the running speed of the AC motor is reduced, thus hampering smooth running of the AC motor.

In order to obviate the above described difficulty in an reduced speed operation of the AC motor, a device for modulating the pulse width (PWM) of the inverter 1 has been proposed to improve the waveform of the output current.

FIG. 5 illustrates an example of a previously proposed PWM controlling apparatus. In the apparatus, reference numerals 4 through 8 designate components similar to those described in FIG. 3. The apparatus further comprises a saw-tooth wave generator 9 for generating saw-tooth wave of a repetition frequency variable in accordance with the magnitude of the input signal $e_f$, an oscillator 10 for generating a triangular waveform of a constant repetition frequency, a subtractor 11, and a comparator 12 for delivering an output signal $e_c$ which is "1" when the input signal is positive and is "0" when the input signal is negative. The apparatus further comprises transfer switches 13 through 18 which are interlinked with each other to be operated simultaneously. That is, when the control signal $e_c$ is "1", the transfer switches 13 through 18 are held in the indicated positions, and when the control signal $e_c$ is "0", the transfer switches are transferred to the opposite positions.

It is so arranged that when the frequency controlling input signal $e_f$ is applied to the saw-tooth wave generator 9, it delivers a saw-tooth wave $e_D$ having a repetition period corresponding to 60° of the inverter operation and an amplitude equal to the amplitude of the triangular wave $e_T$ generated from the oscillator 10.

In FIG. 5, pulse signals $a_1$ through $a_6$ having a pulse width of 60° as in the case of FIG. 3 are obtained at the outputs of the up-down counter 7. Thus, if the transfer switches 13 through 18 were held in the positions shown, it is apparent that the apparatus operates in the same manner at that of FIG. 3. However, when the transfer switches 13 to 18 are operated by the output $e_c$, a PWM control can be obtained as described hereinafter with reference to the time chart shown in FIG. 6.

As is apparent from FIG. 6, the output pulse from the up-down counter 7 is shifted in the sequence of $a_1 \rightarrow a_2 \rightarrow a_3 \rightarrow \ldots$ each time an up-pulse $P_u$ is applied. On the other hand, a saw-tooth wave $e_D$ from the generator 9, which is in synchronism with the output pulses $P_f$ of the voltage-frequency converter 4, is subtracted in a subtractor 11 from the triangular wave $e_T$ delivered from the oscillator 10. A comparator 12 is supervising the variation of the polarity of the output signal of the subtractor 11, and transfers the movable contacts of the transfer switches from 13 to 18 each time when the polarity is changed. More specifically, when an instantaneous amplitude of the saw-tooth wave $e_D$ is smaller than that of the triangular wave $e_T$ (see FIG. 6), the transfer switches 13 to 18 are held at the upper contacting positions shown in FIG. 5, while when an instantaneous amplitude of the saw-tooth wave $e_D$ is greater than that of the triangular wave $e_T$, the transfer switches are transferred to the lower contacting positions.

It is apparent that the transferring cycle period of the transfer switches is equal to the repetition period of the triangular wave $e_T$, and the ratio between the actual periods where the transfer switches stay on the upper positions and the lower positions is determined by the magnitude of the saw-tooth wave $e_D$. During a period corresponding to 60° of the running frequency of the inverter wherein the pulse $a_1$ is delivered from the up-down counter 7, the pulse $a_1$ is caused to alternate between the output positions $e_I$ and $e_{II}$ by the operation of the transfer switch 13. In a range where the amplitude of the saw-tooth wave $e_D$ is smaller than that of the triangular wave $e_T$, the pulse widths of the parts occupying the position $e_I$ are wide, and the pulse widths of the parts occupying the position $e_{II}$ are narrow. However, in accordance with the increase in amplitude of the saw-tooth wave $e_D$, the widths of the first parts staying at the position $e_I$ are reduced, and the widths of the second parts staying at the position $e_{II}$ are increased as shown in FIG. 6.

In the next 60° period where the output of the up-down counter 7 is changed from $a_1$ to $a_2$, the signal $a_2$ is alternated between the output positions $e_{II}$ and $e_{III}$ by the operation of the transfer switch 14. The movement of the current vector for the AC motor 3 in the above described operation of the circuits will now be described with reference to FIG. 2.

During the time interval wherein the up-down counter 7 delivers an output $a_1$, the corresponding current vector alternates between the positions I and II. In the case, when the amplitude of the saw-tooth wave $e_D$ is smaller than that of the triangular wave $e_T$, the interval in which the current vector stays at the position I is longer than the period where the same vector stays at the position II. However, when the amplitude of the saw-tooth wave $e_D$ becomes large, the ratio of the time intervals of the vector staying at the positions I and II is gradually reversed. Moreover, during one cycle period of the triangular wave $e_T$, the average position of the current vector, which is determined by the ratio of the intervals of the vector staying at the positions I and II, is rotated at a constant speed from the position I to the position II. The positions from II to VI of the current vector are also varied in the same manner as described above.

In the PWM control of the inverter, the current vector is rotated smoothly as described above, as the quick movements thereof determined by the frequency of the triangular wave $e_T$ are neglected. Thus, the torque ripple during the low-speed operation of the AC motor 3 can be eliminated, and a smooth running of the motor can be realized.

Although the PWM controlling apparatus has advantages as described above, it requires further circuit components such as the saw-tooth wave generator 9, triangular wave oscillator 10 and the like, thus increasing the manufacturing cost of the same apparatus.

Furthermore, as will be apparent from FIG. 6, the pulse widths of the output signals $e_I$ to $e_{VI}$, which are applied to the gate signal distributing circuit 8, are made to be extremely narrow in the proximity of the minimum value and the maximum value of the saw-tooth wave $e_D$. This pulse width corresponds to an interval between the two successive commutating instructions given to the inverter, and, in an ordinary inverter, the pulse width cannot be made smaller than a predetermined value. For instance, in the inverter 1 shown in FIG. 1, a certain interval of time is required from the instant of delivering a commutation instruction and to the instant of the completion of the commutation. If a following commutating instruction is given before the completion of the preceding commutation, there is a possibility of causing commutation failure. Thus, in the circuit shown in FIG. 5, the interval between the successive commutation instructions must be maintained at a longer value than the interval required for the completion of a commutation. Such a requirement further complicates the construction of the circuit.

In addition, if the above described restriction for the interval between successive commutation instructions is maintained, the ratio between the staying intervals of the current vector at two positions of the PWM control cannot be maintained at a desired value, and a low-frequency torque ripple would be created although the amount of the ripple itself is lower than that of the 120° conduction operation of the inverter.

There has been proposed another PWM controlling apparatus for an inverter, wherein the waveform in one-cycle period of the output current is selected in accordance with a pattern as shown in FIG. 7, and specific higher harmonic components of the torque are thereby reduced to zero.

In FIG. 7, only the positive parts of the three phase output currents $i_R$, $i_S$, and $i_T$ are indicated. If an interval $\alpha_1$ in FIG. 7(a) is assumed to be 12°, the fifth higher harmonic component becomes zero. Likewise, in FIG. 7(b), if an interval $\alpha_1$ is assumed to be 5.82° and $\alpha_2$ is assumed to be 16.25°, the fifth and seventh harmonic components become zero. Furthermore, when the number of pulses in one-half period of the pattern is increased, higher harmonic components of higher orders can be reduced to zero.

In the above described example, however, from the requirement that the minimum commutation period must be selected in consideration of the commutation capability of the inverter 1, and that a minimum amount of higher harmonic components must be maintained, various patterns must be prepared for the operations of variable running frequencies of the inverter, so that a suitable pattern can be selected for each running frequency. This means that the procedure for preparing waveform patterns as shown in FIG. 7 is not suitable for the application to an inverter of variable frequency.

Thus, it is apparent that neither of the conventional PWM controlling apparatus is suitable because of their complicated construction, necessity of adjustments, and the high manufacturing costs.

SUMMARY OF THE INVENTION

A primary object of the present invention is to provide an apparatus for controlling an inverter wherein all of the disadvantages of the conventional apparatus can be substantially eliminated.

Another object of the invention is to provide an apparatus for controlling an inverter wherein the control can be transferred between the 120° conductive mode and the PWM mode without complicating the apparatus.

Still another object of the invention is to provide an apparatus for controlling an inverter wherein the PWM mode of control can be realized without requiring a saw-tooth wave generator or a triangular wave oscillator.

Still further object of the invention is to provide an apparatus for controlling an inverter wherein the PWM mode of control can be obtained without requiring a special device for controlling the inverter in accordance with a specific pattern.

According to one aspect of the present invention, there is provided an apparatus for controlling an inverter which delivers a current vector with a specific number of stable phase positions to an AC load, said apparatus being characterized in that it comprises a phase difference detecting circuit which detects a phase difference ($\theta$) between the output current vector delivered from the inverter and a phase angle instructed by an input instruction signal ($e_f$), and a commutation control circuit for controlling the commutation of the inverter each time the phase difference ($\theta$) thus detected by the phase difference detecting circuit is equal to either one of positive and negative reference values.

According to another aspect of the invention, there is provided an apparatus for controlling an inverter which delivers a current vector with a specific number of stable phase positions to an AC load, said apparatus being characterized in that it comprises a phase difference detecting circuit which detects a phase difference ($\theta$) between the output current vector delivered from the inverter and a phase angle instructed by an input instruction signal ($e_f$); and a commutation control circuit for controlling the commutation of the inverter each time an integration of the phase difference ($\theta$) thus detected by the phase difference detecting circuit is equal to either one of positive and negative reference values.

The phase difference detecting circuit preferably comprises a first transfer switch to receive the input instruction signal ($e_f$) and the polarity reversed instruction signal ($-e_f$) as its inputs, an integrating circuit for integrating the output of the first transfer switch with respect to time, a second transfer switch having two reference values ($\theta_H$ and $\theta_L$) of different magnitudes applied to its inputs, a subtractor subtracting the output ($\theta_f$) of the second transfer switch from the output ($\theta^*$) of the integrating circuit, and a third transfer switch receiving the output signal of the subtractor and the polarity-reversed signal thereof as its inputs for obtaining the phase difference ($\theta$) as its output, the first and third transfer switches being transferred each time the output ($\theta^*$) of the integrating circuit is made equal to either of two reference values selected to be equal to the reference values ($\theta_H$ and $\theta_L$) applied to the inputs of the second transfer switch, and the second transfer switch being transferred each time a commutating signal is applied to the inverter.

The commutation control circuit preferably comprises a first comparator for comparing the phase difference ($\theta$) obtained from the phase difference detecting circuit with a positive reference value for delivering an output "1" when the phase difference ($\theta$) is greater than the positive reference value, a second comparator for comparing the phase difference ($\theta$) with a negative reference value for delivering an output of logic "1" when the phase difference ($\theta$) is less than the negative reference value, an up-down counter having a specific number of output positions for controlling the phase positions of the current vector obtained from the inverter, a first pulse generating circuit connected to receive the output "1" from the first comparator for delivering a signal ($P_u$) to the up-down counter so as to increase the count thereof, and a second pulse generating circuit connected to receive the output "1" from the second comparator for delivering a signal ($P_D$) to the up-down counter so as to decrease the count thereof, whereby a 120° conductive mode of control can be obtained.

The commutation control circuit may further comprise an integrator for time-integrating the phase difference ($\theta$), a third comparator for comparing the integrated output (x) of the integrator with a first reference value and delivering an output of logic "1" when the integrated output (x) is greater than the first reference value, a fourth comparator for comparing the integrated output (x) with a second reference value less than the first reference value for delivering an output of logic "1" when the integrated value (x) is less than the second reference value, a third pulse generating circuit connected to receive the output "1" from the third comparator for delivering a signal ($P_u$) to the up-down counter so as to increase the count thereof, and a fourth pulse generating circuit connected to receive the output "1" from the fourth comparator for delivering a signal ($P_D$) to the up-down counter so as to decrease the count thereof, whereby a pulse width modulated control can be obtained.

Various embodiments of the present invention will now be described in detail with reference to the accompanying drawings.

BRIEF DESCRIPTION OF THE DRAWINGS

In the accompanying drawings:

FIG. 1 is a circuit diagram showing a prior art inverter to which the present invention is applicable;

FIG. 2 is a vector diagram of the output current of the inverter shown in FIG. 1;

FIG. 14 is a block diagram showing a different example of a phase-difference detecting circuit used in the present invention.

DESCRIPTION OF THE PREFERRED EMBODIMENTS

Figure 3:
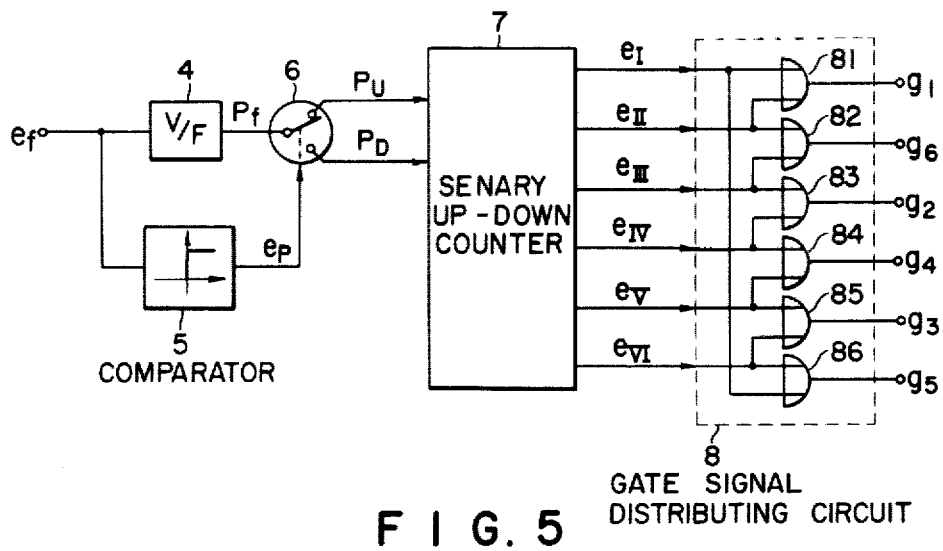
FIG. 3 is a circuit diagram showing a conventional control apparatus for rendering conductive each phase of the inverter for an electric angle of 120°.
Figure 5:
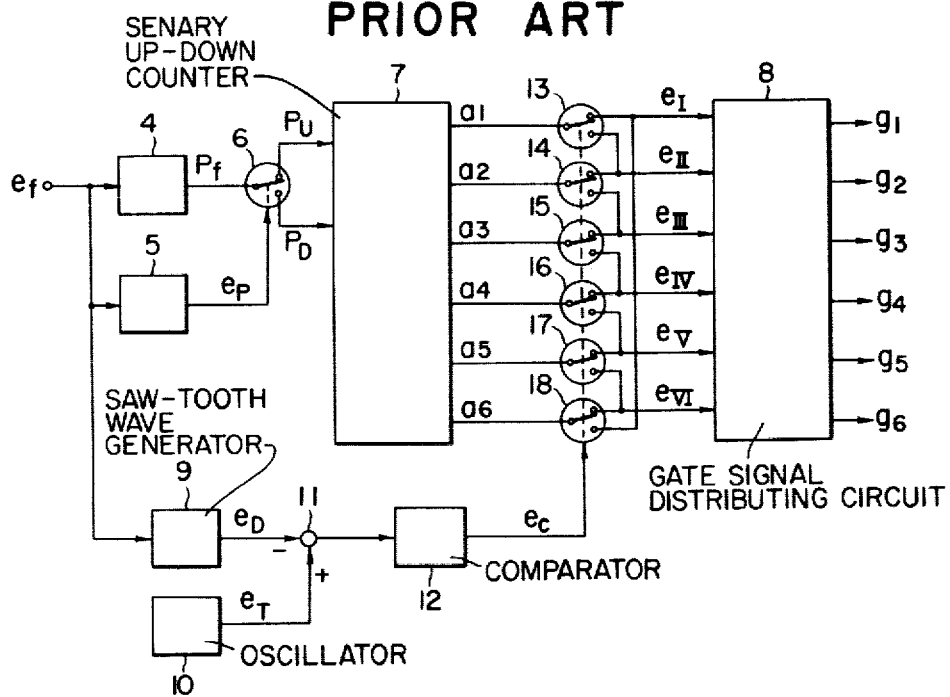
FIG. 5 is a block diagram showing another known apparatus for effecting PWM control of the inverter.
Figure 4:
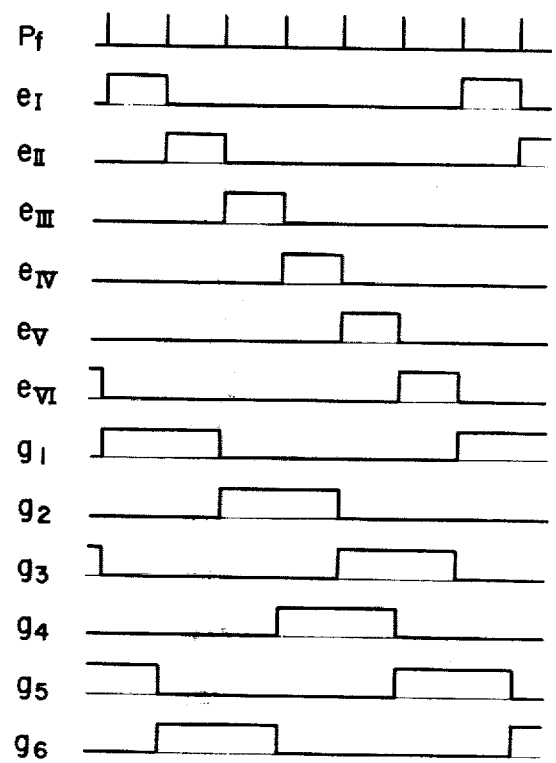
FIG. 4 is a time chart for explaining the operation of the conventional controlling apparatus shown in FIG. 3.
Figure 6:
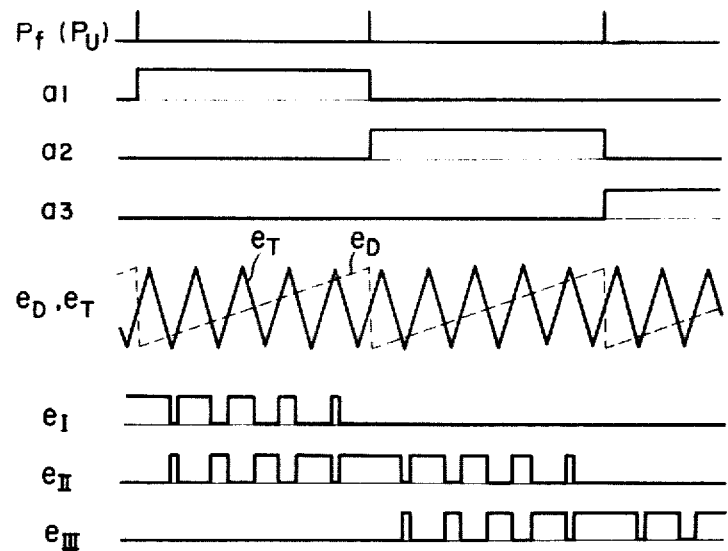
FIG. 6 is a time chart for explaining the operation of the known apparatus shown in FIG. 5.
Figure 7:
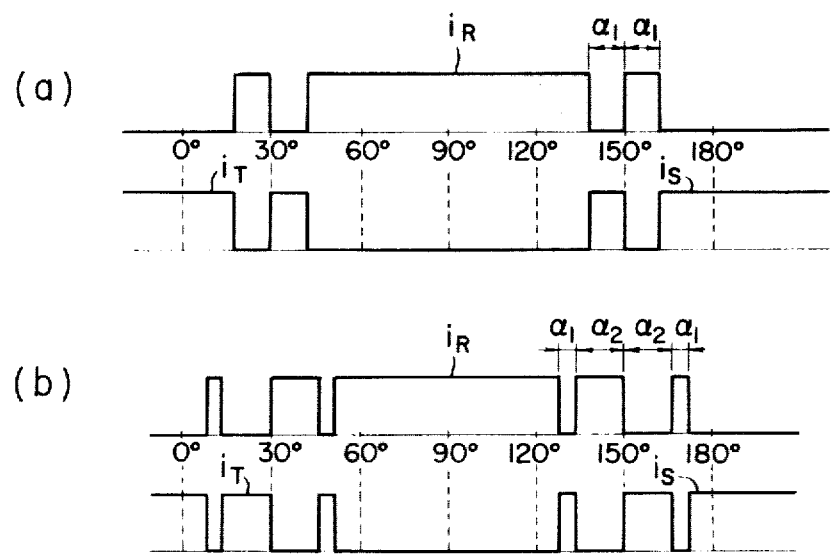
FIGS. 7(a) and 7(b) are waveform diagrams of the output currents of the inverter which is controlled by another type of conventional PWM controlling apparatus.
Figure 8:
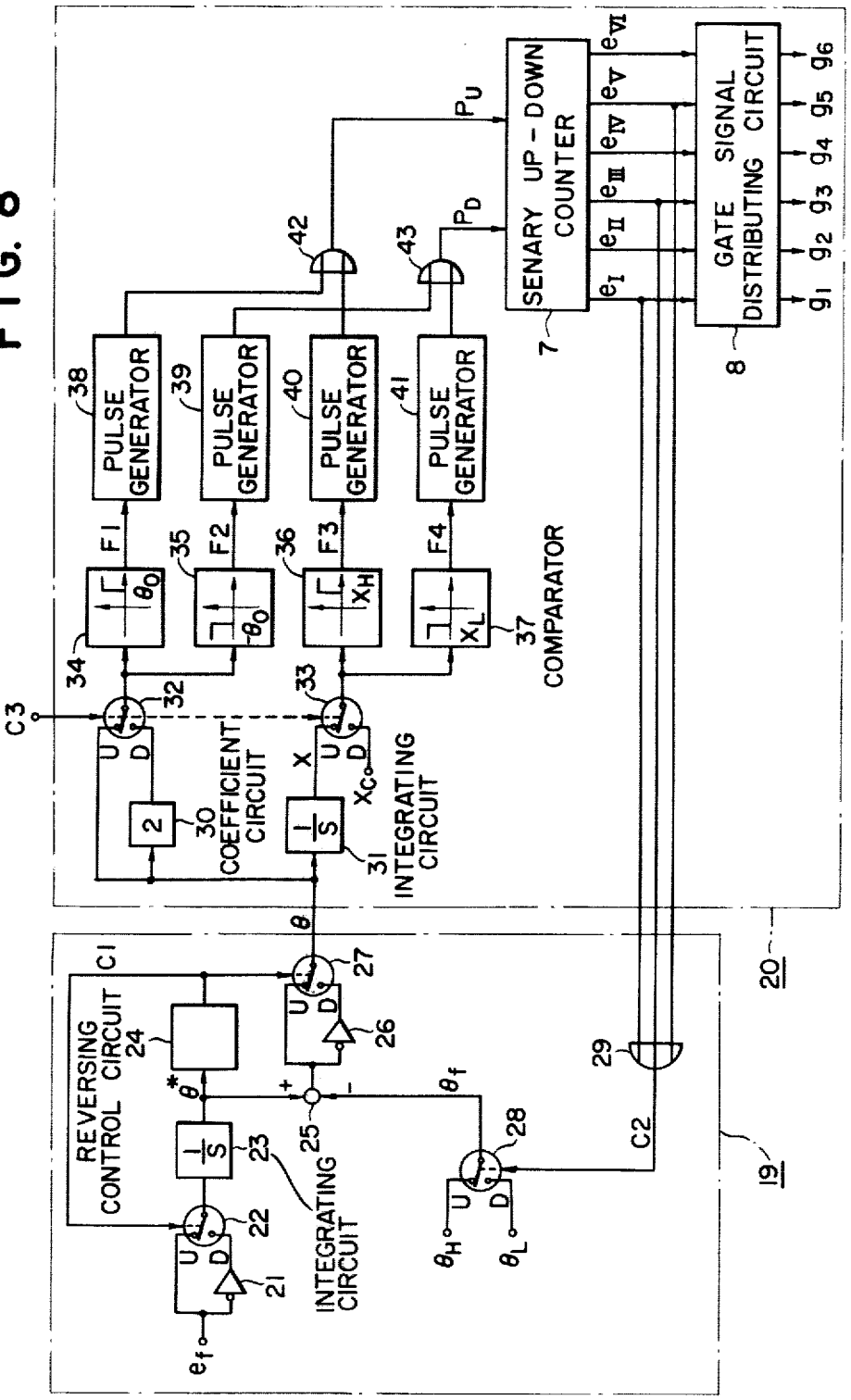
FIG. 8 is a block diagram showing an embodiment of the present invention.

Referring now to FIG. 8 showing a preferred embodiment of the present invention, a senary up-down counter 7 and a gate signal distributing circuit 8 provided in this embodiment are similar to those shown in FIG. 3, so that detailed description thereof is omitted. This embodiment is generally divided into a phase difference detecting circuit 19 and a commutation control circuit 20. As is apparent from FIG. 8, the phase difference detecting circuit 19 comprises a polarity reversing circuit 21, a transfer switch 22, an integrating circuit 23, a reversing control circuit 24, a subtractor 25, another polarity reversing circuit 26, transfer switches 27 and 28, and an OR gate circuit 29.

The commutation control circuit 20, on the other hand, comprises a coefficient circuit 30 which multiplies the input by 2, an integrating circuit 31, transfer switches 32 and 33, comparators 34 to 37, pulse generating circuits 38 to 41, and OR gate circuits 42 and 43.

Each of the transfer switches 22, 27, 28, 32, and 33 has two input terminals U and D, and the transferring operations are controlled respectively by the control signals $C_1$, $C_2$, and $C_3$. That is, when the control signal $C_1$, $C_2$, or $C_3$ is "1", the corresponding transfer switch is transferred to the input terminal U, whereas when the control signal is "0", the transfer switch is transferred to the other input terminal D. The reversing control circuit 24 is composed of a comparator, a flip-flop and else, and delivers an output signal of a reversed logic level when the input of the circuit 24 is made equal to either one of two reference values. The output signal of the reversing control circuit 24 is used for controlling the transfer switches 22 and 27. Each of the comparator circuits 34 and 36 delivers "1" when the input signal thereof is greater than a reference level, and delivers "0" when the input signal thereto is equal to or less than the reference level. On the other hand, each of the comparator circuits 35 and 37 delivers "1" when the input signal thereto is less than a reference level, whereas each of them delivers "0" when the input signal thereto is equal to or greater than the reference level. The pulse generating circuits 38 to 41 generate pulses when the input signals thereto changes from "0" to "1".

In the above described embodiment of the present invention, the input signal $e_f$ for controlling the operating frequency of the inverter is applied to the U terminal of the transfer switch 22, and the same signal the polarity thereof is reversed by the polarity reversing circuit 21 is applied to the D terminal of the transfer switch 22.

The integrating circuit 23 is connected to integrate the output of the transfer switch 22, and the output $\theta^*$ thereof is applied to the reversing control circuit 24 and to the subtractor 25. The output $C_1$ of the reversing control circuit 24 controls the operation of the transfer switches 22 and 27.

The U terminal and the D terminal of the transfer switch 28 respectively receive signals $\theta_H$ and $\theta_L$ of constant values. The transfer switch 28 is controlled by an output signal $C_2$ of the OR gate 29 connected to receive the output signals $e_I$, $e_{III}$, and $e_V$ of the up-down counter 7, and the output $\theta_f$ of the transfer switch 28 is applied to another input of the subtractor 25.

The subtractor 25 delivers an output $\theta^*-\theta_f$ to the U terminal of the transfer switch 27, and the polarity reversed signal of the output $\theta^*-\theta_f$ by another polarity reversing circuit 26 is applied to the D terminal of the transfer switch 27, the operation of which is also controlled by the output signal $C_1$ of the reversing control circuit 24.

The output signal $\theta$ of the transfer switch 27 is applied to the coefficient circuit 30, integrating circuit 31, and directly to the U terminal of the transfer switch 32. The output of the coefficient circuit 30 is applied to the D terminal of the same transfer switch 32. The output of the transfer switch 32 is applied to two comparators 34 and 35, the output of the former comparator 34 being applied to the pulse generating circuit 38, and the output of the latter comparator 35 applied to the pulse generating circuit 39.

The output of the integrating circuit 31 is applied to the U terminal of the transfer switch 33, and a constant value $X_c$ is applied to the D terminal of the same transfer switch 33. The two transfer switches 32 and 33 are controlled by an external signal $C_3$. The output of the transfer switch 33 is applied to the two comparators 36 and 37.

The output $F_3$ of the comparator 36 is applied to the pulse generating circuit 40, and the output $F_4$ of the comparator 37 is applied to the pulse generating circuit 41. The OR gate 42 is connected to receive the outputs of the pulse generators 38 and 40, and the output $P_u$ of the OR gate 42 is applied to the up-input of the up-down counter 7. Likewise, the other OR gate 43 is connected to receive the outputs of the pulse generators 39 and 41, and the output $P_D$ of the OR gate 43 is applied to the down-input of the up-down counter 7.

The function of the present embodiment can be divided into two parts, one obtained by the phase difference detecting circuit 19 and the other realized by the commutation control circuit 20 comprising the component elements 7 and 8 and 30 to 43. The phase difference detecting circuit 19 detects an angular difference between the instructed position and an actual position of the current vector from the inverter 1, and delivers an output signal $\theta$ proportional to the angular difference to the commutation control circuit 20. The commutation control circuit 20 determines the timing of the up-pulses $P_u$ and the down-pulses $P_D$ applied to the up-down counter 7 based on the phase difference signal $\theta$, and controls the commutation of the inverter 1.

The transfer between the PWM operation and the 120° conducting operation of the inverter 1 is carried out by transferring the transfer switches 32 and 33 by application of the external signal $C_3$. When the external signal $C_3$ is "1", PWM operation of the inverter is obtained, and when the external signal $C_3$ is "0", the 120° conducting operation of the inverter 1 can be obtained.

At first, the 120° conducting operation of the inverter will be described.

By setting the external control signal $C_3$ to "0", the transferring switches 32 and 33 are switched to the D terminals. As will be described hereinlater, during the 120° conducting operation of the inverter, the operations of the integrating circuit 31, comparators 36 and 37, and the pulse generating circuits 40 and 41 cause substantially no effect.

A signal $\theta_L$ applied to the D terminal of the transfer switch 28 may be of an arbitrary value, and a value greater by $\theta_o$ than the signal $\theta_L$ is selected for the signal $\theta_H$ applied to the U terminal of the transfer switch 28. The values $\theta_H$ and $\theta_L$ are also used as two reference levels set in the reversing control circuit 24. The difference $\theta_o$ of the two reference levels $\theta_H$ and $\theta_L$, that is $\theta_o = \theta_H - \theta_L$, is used as the reference level of the comparator 34, and $-\theta_o$ is used as the reference level of the comparator 35.

The operation of the embodiment shown in FIG. 8 which is set to the 120° conductive operation of the inverter and the reference levels of the comparators are set as described above, will now be described with reference to a time chart shown in FIG. 9. Since the comparison of an input signal $2\theta$ (delivered from the 2-coefficient circuit 30, a circuit which multiplies an input by 2) with the reference levels $\pm\theta_o$ in the comparators 34 and 35, is equivalent to the comparison of the output signal $\theta$ from the transfer switch 27 with reference levels of $\pm\theta_o/2$, the time chart 9 relating to the latter notation.

Figure 9:
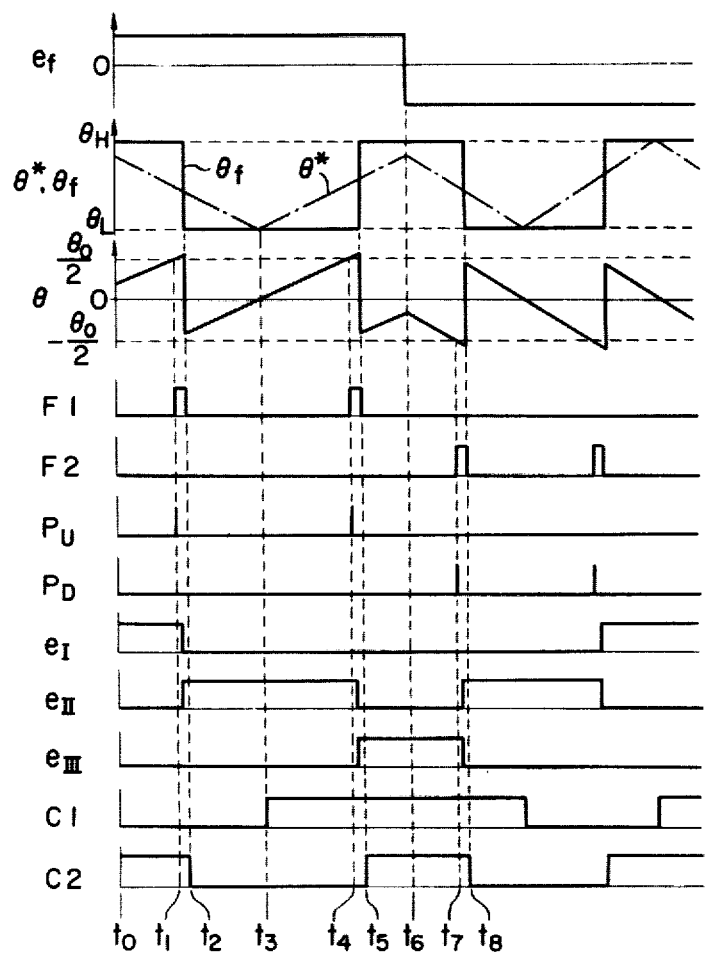
FIG. 9 is a time chart for explaining the control operation of the embodiment shown in FIG. 8 in which each phase of the inverter is rendered conductive for an electric angle of 120°.

In FIG. 9, there are indicated operational timing of various parts of the embodiment starting from an instant $t_o$ where a positive constant value is applied as the running frequency instructing signal $e_f$, the output signal $C_1$ of the reversing control circuit 24 is "0", and the up-down counter 7 delivers an output signal $e_I$ in "1" state. In this case, the transfer switch 22 is transferred to the terminal D held at $-e_f$, the transfer switch 27 is transferred to the terminal D held at $\theta_f - \theta^*$, and the transfer switch 28 delivers the output $\theta_H$. The negative input $-e_f$ is applied to the integrating circuit 23, and the output $\theta^*$ of the circuit 23 is constantly reduced, while the output $\theta(=\theta_f - \theta^*)$ of the transfer switch 27 is constantly increased. The signal $\theta$ increases to $\theta_o/2$ at an instant $t_1$, and the comparator 34 delivers an output $F_1$ in "1" state. Upon detection of the building up to "1" of the output $F_1$, the pulse generating circuit 38 delivers a pulse. This pulse is applied through the OR gate 42 to the up-down counter 7 as an up-pulse $P_u$, and the output signal "1" of the up-down counter 7 is shifted to the output position $e_{II}$.

The OR gate 29 is connected as described hereinbefore to receive outputs $e_I$, $e_{III}$, and $e_V$ among the six outputs $e_I$ to $e_{VI}$ of the up-down counter 7, of which only one output becomes "1". Thus, the output $C_2$ of the OR gate 29 is varied between "0" and "1" each time an input pulse $P_u$ or $P_D$ is applied to the up-down counter 7. More specifically, the output $C_2$ of the OR gate 29 is varied from "1" to "0" at an instant $t_2$ which is somewhat later than the instant $t_1$ when the comparator 34 detects the increase of the input $\theta$ to the value equal to $\theta_o/2$ because of the operation times required for the intermediate circuit components.

As a result, the output $\theta_f$ of the transfer switch 28 is varied from $\theta_H$ to $\theta_L$, and the signal $\theta$ equal to $\theta_f - \theta^*$ is reduced at the instant $t_2$ by $\theta_o$ as shown in FIG. 9. Since the output $\theta^*$ of the integrating circuit 23 is reduced during the interval between the instants $t_1$ and $t_2$, the value of the output $\theta$ just before the output $\theta_f$ of the switch 28 being varied from $\theta_H$ to $\theta_L$, exceeds $\theta_o/2$. Thus, when the output $\theta$ is reduced by a value corresponding to $\theta_o$, the output $\theta$ is not yet reduced to the level of $-\theta_o/2$, and only the output $F_1$ of the comparator 34 is varied from "1" to "0".

After the instant $t_2$, the output $\theta^*$ of the integrating circuit 23 reduces continuously, and therefore the output $\theta$ again increases. The continuously reducing output $\theta^*$ of the integrating circuit 23 will soon be reduced to a value $\theta_L$ at an instant $t_3$. The reverse controlling circuit 24 changes the output $C_1$ from "0" to "1" at this instant $t_3$, and transfers the contacting positions of the transfer switches 22 and 27.

Thus, a positive input $e_f$ is given to the integrating circuit 23, and the output $\theta^*$ thereof increases. Furthermore, the output $\theta$ of the thus transferred switch 27 is changed to $\theta^* - \theta_f$, and is continuously increased even after the instant $t_e$ until it reaches $\theta_o/2$ at an instant $t_4$. As was the case of the interval between $t_1$ and $t_2$, the value of the output $\theta$ exceeds the value $\theta_o/2$ in the interval between the instant $t_4$ and an instant $t_5$, and another output $F_1$ is delivered from the comparator 34 to the pulse generator 38. Thus, the pulse generator 38 delivers an up-pulse $P_u$ through the OR gate 42 to the up-down counter 7. The counter 7 thus delivers an output signal $e_{III}$ of "1" which in turn is delivered to the OR gate 29. The output $C_2$ of the OR gate 29 is then changed to "1", the output $\theta_f$ of the transfer switch 28 is changed again from $\theta_L$ to $\theta_H$ at the instant $t_5$, and the output $\theta$ of the transfer switch 27 is at the same instant reduced by an amount $\theta_o$.

In this manner, the output signals from the up-down counter 7 are varied sequentially, which in turn vary the outputs of the gate signal distributing circuit 8, and control the commutation of the inverter 1.

In FIG. 9, there is further indicated a case where the running frequency instruction signal $e_f$ is varied from the positive value to a negative value at an instant $t_6$.

The output $\theta^*$ of the integrating circuit 23 which has been increased constantly, now starts to be reduced because of the negative input signal $e_f$. The output signal $\theta$ of the transfer switch 27 is thus reduced to $-\theta_o/2$ at an instant $t_7$. The comparator 35 detecting the reduction of the output $\theta$ delivers an output $F_2$ which builds up from "0" to "1", and a pulse is thereby delivered from the pulse generating circuit 39. The output pulse from the pulse generator 39 is applied through the OR gate 43 to the up-down counter 7 as a down pulse $P_D$. An output of a logic "1" of the up-down counter 7 is thus shifted from $e_{III}$ to $e_{II}$. As a result, the output $\theta_f$ of the transfer switch 28 is varied from $\theta_H$ to $\theta_L$ at an instant $t_8$ a little later than the instant $t_7$ because of the operation time of the circuit components, and the output $\theta$ of the transfer switch 27 is thus increased by an amount of $\theta_o$. After the instant $t_8$, the input pulses $P_u$ and $P_D$ applied to the up-down counter 7 are controlled depending on the polarity and magnitude of the running frequency instructing signal $e_f$, and the commutation of the inverter 1 is thereby controlled.

As will be apparent from the above description, the commutation period is equal to the period required for the variation of the output $\theta^*$ of the integrating circuit 23 by an amount of $\theta_o$. Since the commutation period is 1/6 of that of the running frequency, it can easily be understood that the running frequency $f = e_f/6\theta_o$. The output signal $\theta^*$ of the integrating circuit 23, which integrates the running frequency instruction signal $e_f$, is an instruction for the rotating angle of the current vectors delivered from the inverter 1. When the signal $e_f$ is simply integrated, the integrating circuit 23 will be saturated in a short time. In order to prevent such a disadvantage, the polarity of the input signal $e_f$ is changed by the transfer switch 22, so that signal is always varied within an operational range of $\theta_o = \theta_H - \theta_L$. Since the operational range $\theta_o$ is selected to be equal to a rotating angle 60° of the current vectors obtained from the inverter, the actual displacement of the current vector is fedback to the input of the subtractor 25 through the transfer switch 28. Thus, it is apparent that the output $\theta$ of the transfer switch 27 is an amount proportional to the angular difference between the output current vector and an instruction vector.

In the embodiment shown in FIG. 8, the operation of which has been described with reference to FIG. 9, at the time of 120° current flowing operation of the inverter, the circuit is so constructed that when the angular difference between the output current vector and the instruction vector becomes 30°, the commutation of the inverter 1 is carried out, and therefore the current vector following the instructed value is always delivered from the inverter.

When an external control signal $C_3$ of a logic "1" is applied to the transfer switches 32 and 33, these switches are thrown to the U terminals for effecting the PWM operation of the inverter. The reference level $X_L$ of the comparator 37 is selected at an arbitrary value, and the reference level $X_H$ of the comparator 36 is selected at a greater value than the reference level $X_L$.

The PWM operation of the embodiment shown in FIG. 8 will now be described with reference to a time chart shown in FIG. 10 for a case where the frequency instruction signal $e_f$ is a positive constant value. In the description, the operational delay from the instant where an up-pulse $P_u$ or a down-pulse $P_D$ is applied to the up-down counter 7 to the instant where the transfer switch 28 is actually thrown as described with reference to FIG. 9 will be neglected for the simplification of the description.

Figure 10:
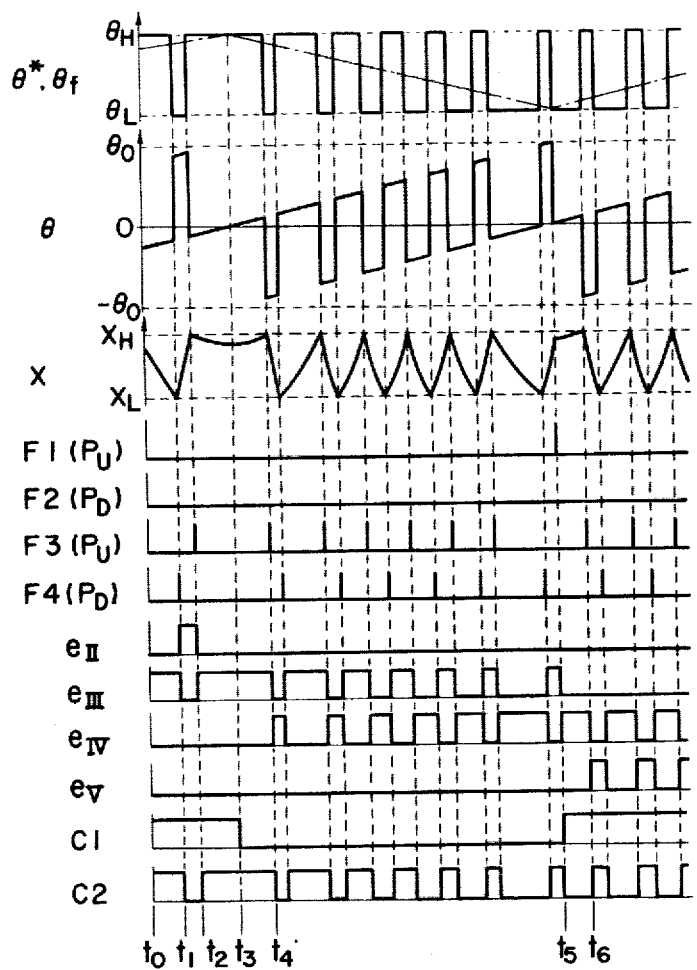
FIG. 10 is a time chart for explaining the PWM control operation of the embodiment shown in FIG. 8.

In the time chart shown in FIG. 10, it is assumed that at an instant $t_o$, the output $C_1$ of the reversing control circuit 24 is "1", the output signal $e_{III}$ of the up-down counter 7 is "1", and the output $C_2$ of the OR gate circuit 29 is also "1". After the instant $t_o$, the output $\theta^*$ of the integrating circuit 23 increases, and since the output $\theta_f$ of the transfer switch 28 is $\theta_H$, the output $\theta$ of the transfer switch 27 is held at a negative value.

Accordingly, the output X of the integrating circuit 31 reduces after the instant $t_o$, and reaches the lower value $X_L$ at an instant $t_1$. The output $F_4$ of the comparator now builds up, and the pulse generator 41 delivers a down-pulse $P_D$ to the up-down counter 7 through the OR gate 43. Thus the output "1" of the up-down counter 7 is shifted in the reverse direction from $e_{III}$ to $e_{II}$, and a commutation, in the reverse direction, of the inverter 1 is effected. The output $C_2$ of the OR gate 29 is varied to "0", thus changing the output $\theta_f$ of the transfer switch 28 to $\theta_L$. The output $\theta$ of the transfer switch 27 becomes positive after the instant $t_1$, and the output X of the integrating circuit 31 increases to $X_H$ at an instant $t_2$. Now the output $F_3$ of the comparator 36 builds up, causing the pulse generating circuit 40 to deliver an up-pulse $P_u$ to the up-down counter 7 through the OR gate 42. The output "1" of the up-down counter 7 is thus changed back to $e_{III}$. The output $C_2$ of the OR gate 29 becomes "1", changing the output $\theta_f$ of the transfer switch 28 to $\theta_H$ and the output $\theta$ of the transfer switch 27 to a negative value.

Although the output X of the integrating circuit 31 starts to reduce, the reduction rate of the output X becomes little when the output $\theta^*$ of the integrating circuit 23 gets nearer to $\theta_H$. At an instant $t_3$ when the output $\theta^*$ of the integrating circuit 23 becomes equal to $\theta_H$, the output $C_1$ of the reversing control circuit 24 is changed from "1" to "0", while the output of the switch 22 becomes negative, and simultaneous with the initiation of the reduction of the output $\theta^*$ of the integrating circuit 23, the output $\theta$ of the transfer switch 27 is reversed to the positive polarity.

According to the reduction of the output $\theta^*$ of the integrating circuit 23, the output $\theta$ of the transfer switch 27 increases, and the output X of the integrating circuit 31 to which is applied the output $\theta$ again reaches the $X_H$ level at an instant $t_4$. The output $F_3$ of the comparator 36 thus builds up, and the up-pulse $P_u$ delivered from the pulse generator 40 is applied through the OR gate 42 to the up-down counter 7. The output "1" of the up-down counter 7 is thereby obtained at its output $e_{IV}$, and as the output $C_2$ of the OR gate 29 becomes "0", the output $\theta_f$ of the transfer switch 28 changes from $\theta_H$ to $\theta_L$. Thus, the output $\theta$ of the transfer switch 27 becomes negative, and the output X of the integrating circuit 31 starts to reduce.

As described above, each time an up-pulse $P_u$ or down-pulse $P_D$ is applied to the up-down counter 7, the output $\theta_f$ of the transfer switch 28 is changed between the two levels $\theta_H$ and $\theta_L$, with the simultaneous change of the output of the integrating circuit 31 between the increasing and decreasing tendencies. That is, when the up-pulse $P_u$ and down-pulse $P_D$ are alternately applied to the up-down counter 7, the output "1" of the same counter 7 fluctuates between the outputs $e_{III}$ and $e_{IV}$. At this time, the value of the output $\theta^*$ of the integrating circuit 23 varies the interval of the application of the input pulses to the up-down counter 7, and the duration of the output $e_{IV}$ staying at the "1" level is made gradually longer than that of the output $e_{III}$ as shown in FIG. 10.

In the ordinary PWM operation of the embodiment, the output $\theta$ of the transfer switch 27, determined by the difference between the output $\theta^*$ of the integrating circuit 23 and the output $\theta_f$ of the transfer switch 28, is varied in a range of $\pm\theta_o$, and therefore there are no possibilities of the outputs $F_1$ and $F_2$ of the comparators 34 and 35 becoming "1" and of the pulse generators 38 and 39 delivering pulses to the up-down counter.

However, in a special case of the same operation, an output pulse is delivered from the pulse generator 38 at an instant $t_5$ shown in FIG. 10. Just before instant $t_5$, the transfer switch 28 produces an output $\theta_f$ of a level $\theta_H$, while the integrating circuit 23 produces an output having a level close to $\theta_L$. Thus, the output $\theta$ of the transfer switch 27 is near the $\theta_o$ level, and the output X of the integrating circuit 31 is increasing. Before the output X of the integrating circuit 31 reaches $X_H$, the output $\theta$ of the transfer switch 27, which increases in accordance with the decrease of the output $\theta^*$ of the integrating circuit 23, reaches $\theta_o$ at the instant $t_5$. Thus, the output $F_1$ of the comparator 34 becomes "1", and by the building-up of the output $F_1$, an up-pulse $P_u$ is delivered from the pulse generating circuit 38 to the up-down counter 7 through the OR gate 42.

At this instant $t_5$, the reversing control circuit 24, which detects the reduction of the output $\theta^*$ of the integrating circuit 23 to $\theta_L$, changes its output $C_1$ from "0" to "1", and furthermore the output $\theta_f$ of the transfer switch 28 is transferred to $\theta_L$. Thus, the output $\theta$ of the transfer switch 27 having been reduced to 0 again builds up. As a result, the output X of the integrating circuit 31 becomes $X_H$ at an instant $t_6$, and the comparator 36 delivers an output pulse $F_3$. In response to the pulse $F_3$, the pulse generating circuit 40 delivers an up-pulse $P_u$ to the up-down counter 7 through the OR gate 42. The output $e_V$ of the up-down counter 7 thus becomes "1". After the instant $t_6$ the outputs $e_{IV}$ and $e_V$ of the up-down counter 7 alternately become "1" as was the case of the outputs $e_{III}$ and $e_{IV}$ after the instant $t_4$.

As will be apparent from the above description, the input signal $X_c$, which has been applied to the input terminal D of the transfer switch 33 for obtaining the 120° conducting operation of the inverter 1, may have any suitable value greater than $X_L$ and smaller than $X_H$. By so selecting, the outputs of the comparator circuits 36 and 37 are always kept to "0" during the 120° conducting operation, and the pulse generating circuits 40 and 41 generate no output pulses.

Figure 11:
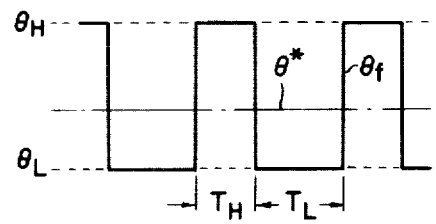
FIG. 11 is a waveform diagram for explaining the characteristics of an output obtained by the embodiment shown in FIG. 8.

The modulation period and the like realized by the PWM control operation of the present invention, which has been described with reference to the time chart of FIG. 10, will now be described with reference to FIG. 11 which indicates the output $\theta_f$ of the transfer switch 28 in the case where the output $C_1$ of the reversing control circuit 24 is "1" and the output $\theta^*$ of the integrating circuit 23 is a constant. It is apparent that the two values $\theta_H$ and $\theta_L$, either of which can be taken as the output $\theta_f$, correspond to phase positions of two adjacent current vectors among the six current vectors I through VI, which have a phase difference of 60°, and it is also apparent that the output $\theta^*$ corresponds to a commanding phase angle designated between the two adjacent vectors having the phase difference of 60°. The intervals $T_H$ and $T_L$ during which the output $\theta_f$ of the transfer switch 28 stays at the $\theta_H$ and $\theta_L$ levels correspond respectively to intervals wherein a current vector is held at the two phase positions.

Since the commutation occurs each time when the output X of the integrating circuit 31 receiving the output $\theta$ of the transfer switch 27, is made to be equal to either one of the reference levels $X_H$ and $X_L$ set in the comparators 36 and 37, following relation is established between the two staying periods $T_H$ and $T_L$.

$$(\theta_H - \theta^*) \cdot T_H = (\theta^* - \theta_L) \cdot T_L = X_H - X_L$$

From this relation, following equations can be obtained.

$$T_H = \frac{X_H - X_L}{\theta_H - \theta^*} \quad (1)$$

$$T_L = \frac{X_H - X_L}{\theta^* - \theta_L} \quad (2)$$

Because the sum of $T_H$ and $T_L$ corresponds to the modulation period $T_M$, $$T_M = T_H + T_L = \frac{\theta_o(X_H - X_L)}{(\theta^* - \theta_L)(\theta_H - \theta^*)} \quad (3)$$

From the fact that the staying intervals $T_H$ and $T_L$ are selected so that the integrated values of $(\theta_H - \theta^*)$ and $(\theta^* - \theta_L)$ are both equal to $(X_H - X_L)$, it is apparent that the average value of $\theta_f$ within the modulation period $T_M$ is equal to $\theta^*$.

Furthermore, as will be apparent from the Equation (3), the modulation period $T_M$ of the PWM operation of this invention is varied in accordance with the variation of $\theta^*$, and the modulation period $T_M$ is the shortest when $\theta^*$ is equal to $(\theta_H - \theta_L)/2$, while the same period $T_M$ becomes longer when $\theta^*$ gets nearer to $\theta_H$ or $\theta_L$. In other words, when the commanding vector postition $\theta^*$ of the current vector gets nearer to either one of the vector positions $\theta_H$ and $\theta_L$ located on both sides of the vector position $\theta^*$, and when the ratio of the staying intervals $T_H$ and $T_L$ in these vector positions $\theta_H$ and $\theta_L$ becomes greater or smaller, the shorter one of the staying interval $T_H$ and $T_L$ will not be shortened with the same ratio. For instance, the shorter one of the interval $T_H$ and $T_L$, which becomes shortest when $\theta^*$ is equal to $\theta_H$ or $\theta_L$, is one half of the value of the staying intervals $T_H$ and $T_L$ which are made equal when $\theta^*$ is at the middle point between $\theta_H$ and $\theta_L$.

Accordingly, there is no possibility of one instructed commutation period of the inverter 1 becoming too short, and the requirements for the commutation capability of the inverter can be alleviated. Furthermore, the modulation period $T_M$ of the PWM operation can be easily varied by varying the integrating time constant of the integrating circuit 31 or varying the difference between the reference levels $X_H$ and $X_L$ in the comparators 36 and 37.

As described hereinabove, according to the present invention, the control of the inverter can be changed between the 120° conduction mode and the PWM mode by a simple construction of the circuit as shown in FIG. 8 wherein the control signal $C_3$ for the transfer switches 32 and 33 is changed between two different levels. Furthermore, the vector positions of the output current vectors are not changed abruptly at the time of controlling the operational mode, and a smooth transfer of the operational mode can be thereby attained.

Figure 12:
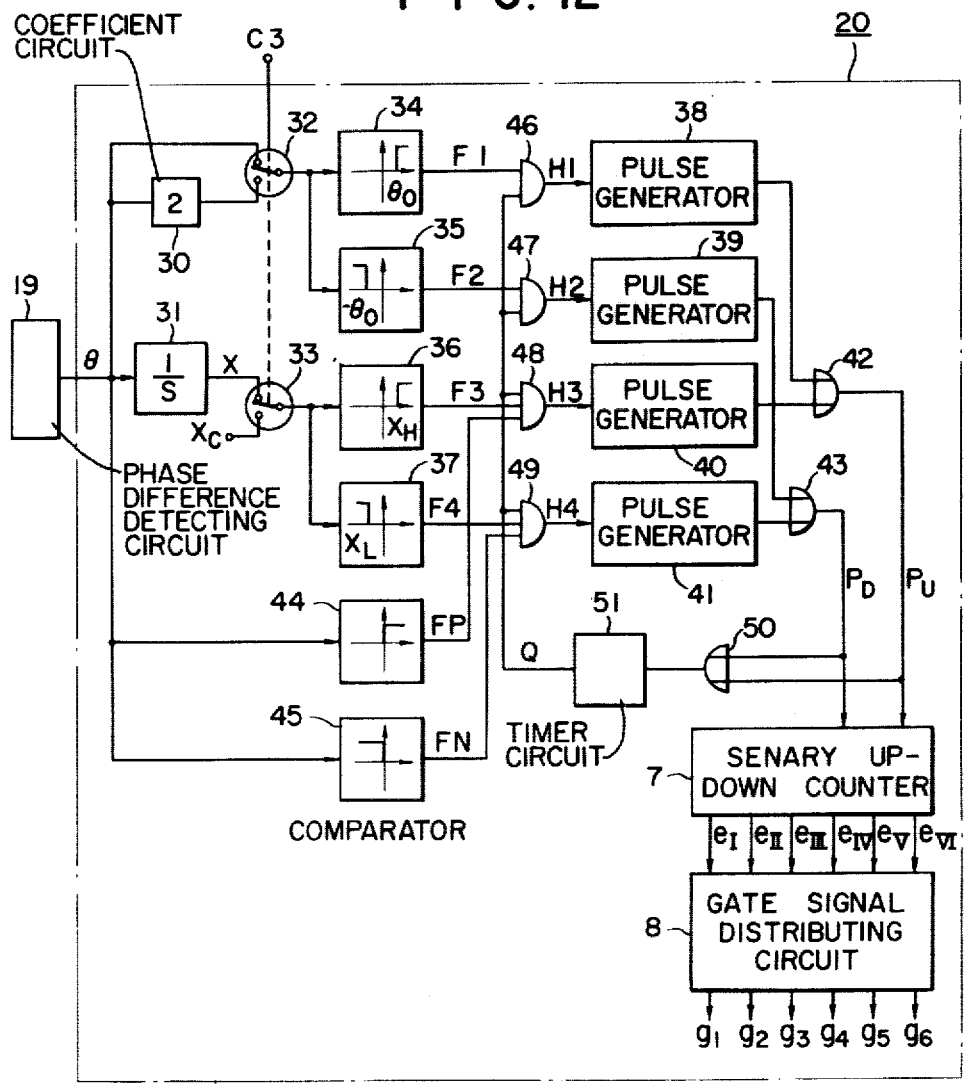
FIG. 12 is a block diagram showing another embodiment of the present invention.

Also according to the present invention, the instructed value of the commutation period of the inverter can be easily maintained at a value greater than a predetermined value. FIG. 12 illustrates such an embodiment of the present invention. In this embodiment, like members and parts as in the embodiment shown in FIG. 8 are designated by like reference numerals, and detailed descriptions of these members or parts are omitted.

In the embodiment shown in FIG. 12, there are provided additional comparators 44 and 45 in its commutation control circuit 20. The comparator 44 delivers "1" when its input signal is positive, while the comparator 45 delivers "1" when its input signal is negative. The control circuit 20 further includes AND circuits 46 through 49 each delivering "1" when all the inputs thereof are in "1" state, and an OR gate 50 which delivers an output "1" to a timer circuit 51 when either one of the inputs of the OR gate is "1". The timer circuit 51 is constituted by, for instance, a monostable multivibrator, and delays the delivery of an output Q for a predetermined time.

The principal difference of the embodiment shown in FIG. 12 from that of FIG. 8 resides in that the output signals $H_1$ through $H_4$ of the AND gates 46 through 49 are applied to the pulse generating circuits 38 through 41 as their inputs.

The AND gate 46 is connected to receive the output $F_1$ of the comparator 34 and the output Q of the timer circuit 51, and the AND gate 47 is connected to receive the output $F_2$ of the comparator 35 and the output Q of the timer circuit 51, while the AND gate 48 receives the outputs $F_3$ and FP of the comparators 36 and 45 and also the output Q of the timer circuit 51. The AND gate 49 receives the outputs $F_4$ and FN of the comparators 37 and 45 and the output Q of the timer circuit 51. The comparators 44 and 45 are connected to receive the output $\theta$ obtained from the phase difference detecting circuit 19. The OR gate 50 receives as its inputs the outputs $P_U$ and $P_D$ from the OR gates 42 and 43.

In the operation of the embodiment shown in FIG. 12, when the output Q of the timer circuit 51 is "1", the outputs $H_1$ and $H_2$ of the AND gates 46 and 47 are equal to the outputs $F_1$ and $F_2$ of the comparators 34 and 35, respectively. Likewise, when the output Q of the timer circuit 51 is "1", the output $H_3$ of the AND gate 48 is equal to the output $F_3$ of the comparator 36 because the output $F_3$ builds up to "1" when the input signal X of the comparator 36 reaches the $X_H$ level, and since the input $\theta$ to the integrating circuit 31 is positive at this time, the output FP of the comparator 44 is changed to "1". In the similar manner, when the output $F_4$ of the comparator 37 builds up to "1", the output FN of the comparator 45 becomes "1", and therefore when the output Q of the timer circuit 51 is "1", the output $H_4$ of the AND gate 49 becomes equal to the output $F_4$ of the comparator 37.

Accordingly, when the output Q of the timer circuit 51 is "1", the operation described so far of the embodiment shown in FIG. 12 is substantially equal to that of the embodiment shown in FIG. 8. Furthermore, when none of the outputs $F_1$ through $F_4$ of the comparators 34 through 37 builds up to "1" within an inhibiting interval of time $T_S$, where the output Q of the timer circuit 51 is still in the state of "0", after an input signal $P_U$ or $P_D$ has been applied to the up-down counter 7, the remaining part of operation of the embodiment of FIG. 12 is also substantially equal to that of the embodiment of FIG. 8.

The advantageous effects of the embodiment shown in FIG. 12 will now be described with reference to the time chart shown in FIG. 13.

Figure 13:
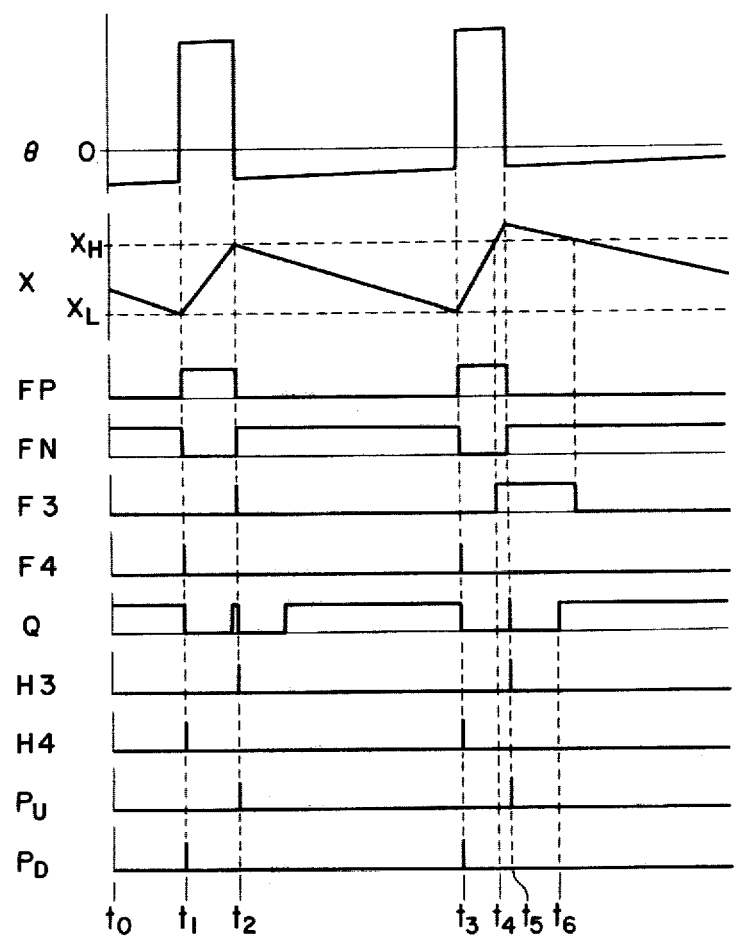
FIG. 13 is a time chart for explaining the operation of the embodiment shown in FIG. 12.

In FIG. 13, since the output Q of the timer circuit 51 is "1" when the output X of the integrating circuit 31 is made equal to the reference values of the comparators 36 and 37 at the instants $t_1$, $t_2$, and $t_3$, the outputs $H_3$ and $H_4$ of the AND gates 48 and 49 are equal to the outputs $F_3$ and $F_4$ of the comparators 36 and 37, respectively. Thus, the operation of this part of the embodiment of FIG. 12 is similar to that of the embodiment of FIG. 8 described with reference to the time chart of FIG. 10. After the instant $t_3$, the increasing output X of the integrating circuit 31 reaches the $X_H$ level at an instant $t_4$, and the output $F_3$ of the comparator 36 becomes "1" at the same instant $t_4$. However, the output Q of the timer circuit 51 which has been brought to "0" by the application of the pulse $P_D$ at the instant $t_3$ is still in the inhibition interval $T_S$, and therefore the output Q is kept in "0" state at the instant $t_4$. Accordingly, the output $H_3$ of the AND gate 48 does not build up to "1" at the instant $t_4$, and the pulse generating circuit 40 delivers no output pulse.

Since the outputs of the up-down counter 7 are not varied, the output $\theta$ of the phase difference detecting circuit 19 is held positive after the instant $t_4$. Thus the output X of the integrating circuit 31 continuously increases, and the output $F_3$ of the comparator 36 is held at "1". At an instant $t_5$, when the inhibition interval $T_S$ which has been set in the timer circuit 51 at the instant $t_3$ terminates, the output Q of the timer circuit 51 becomes "1", and the output $H_3$ of the AND gate 48 also becomes "1". Thus, an up-pulse $P_U$ is delivered from the pulse generating circuit 40 to the up-down counter 7 through the OR gate 42.

After the instant $t_5$, the output X of the integrating circuit 31 starts to decrease. However, the output of the comparator 36 is kept at "1" until the output X is reduced to a value below the $X_H$ level. After the termination of the inhibit interval $T_S$ initiated at the instant $t_5$, the output Q of the timer circuit 51 becomes "1" at an instant $t_6$. However, since the input $\theta$ of the integrating circuit 31 is a negative value, and the output FP of the comparator 44 is "0", the output $H_3$ of the AND gate 48 is held at "0", and the pulse generator 40 delivers no output pulse. After the instant $t_5$, if the output $\theta$ of the phase difference detecting circuit 19 applied to the integrating circuit 31 would become positive due to a variation of the instructed phase angle while the output X of the integrating circuit 31 is held at a level higher than $X_H$, the output $H_3$ of the AND gate 48 will build up to "1", and the pulse generating circuit 40 will deliver the output pulse after the time instant $t_6$. This means that a commutation control of the inverter 1 precisely following the instruction can be obtained by this embodiment. Furthermore, because of the above described operation, the control of the inverter can be assured, even in a case where the output $\theta$ of the phase difference detecting circuit 19 exceeds the $\pm\theta_o$ levels, due to the output X of the integrating circuit 31 and the operations of the comparators 44 and 45, and the necessity of utilizing the output pulses from the pulse generators 38 and 39 during the PWM operational mode can be substantially eliminated. As a result, the circuit may be so constructed that the comparators 34 and 35 are used only in the 120° conductive operational mode, and thus the circuit can be simplified.

According to the embodiment shown in FIG. 12, there is no possibility of the time interval between the input pulses, such as $P_u$ and $P_D$, applied to the up-down counter 7 becoming shorter than the inhibition interval $T_S$ set in the timer circuit 51. Thus, by selecting the inhibition interval $T_S$ at a value well adapted for the commutation capability of the inverter 1, the possibility of the commutation failure of the inverter 1 can be eliminated.

In other words, when the instructed timing of the commutation is delayed by the setting of the inhibition interval $T_S$ from an instant $t_4$ to another instant $t_5$ as shown in FIG. 13, the amplitude of the variation of the output X of the integrating circuit 31 becomes greater than $X_H - X_L$. However, the timing of the next commutation is also determined by the same variation of the output X, and the ratio of the two staying intervals in the two positions of the current vectors is not varied. As a result, the commutation is controlled such that the average value of the phase difference $\theta$ within one PWM modulation period $T_M$ is always held at zero.

In the case of 120° conducting control mode, when commutation is effectuated at an instant where the input signal $2\theta$ applied to the comparators 34 and 35 reaches either one of the reference levels $\pm\theta_o$, the input signal $2\theta$ to the two comparators 34 and 35 jumps-over by an angle of $2\theta_o$. However, the pulse generating circuits 38 and 39 deliver no pulses during the inhibition period, where the output Q of the timer circuit 51 is "0", regardless of the possibility of tending the input signal $2\theta$ to reach the other reference level. This means that an ample allowance may be taken for the setting of the reference levels $\pm\theta_o$ of the comparators 34 and 35, and the adjustement of the circuit is thereby facilitated.

However, too long inhibition interval $T_S$ against the commutation instruction period causes a long PWM modulation period which reduces the advantage of the same mode of control. That is, the optimum value of the inhibition interval $T_S$ corresponds to a period between the application of a commutation instruction to the inverter 1 and the completion of the commutation.

Accordingly, if the actual output current from the inverter 1 were to be detected, the interval between the application of a commutating instruction and ending at an instant where the output current of the commutated phase of the inverter becomes zero should be found out, and a circuit delivering "0" output for the aforementioned interval be used instead of the timer circuit 51 of FIG. 12. Then the above described excessively long delay of the commutation will be avoided, and an optimum inhibition interval $T_S$ can be obtained.

FIG. 14 illustrates still another embodiment of the phase difference detecting circuit 19 adapted to realize the aforementioned construction. In this embodiment, there are provided a gate signal distributing circuit 8 which is similar to that shown in the commutation control circuit 20 shown in FIGS. 8 and 12, an oscillator 52 delivering a two-phase sinusoidal output, both phases $\alpha^*$ and $\beta^*$ having amplitudes equal to unity, on-off switches 53 through 62 controlled by the outputs of the gate signal distributing circuit 8, coefficient circuits 63 through 72 connected to multiply the outputs of the on-off switches 53 through 62 by respective coefficients shown in the blocks, an adder 73 which delivers the sum of all the outputs of the coefficient circuits 63 through 72, and a function generator 74 which delivers an output signal equal to the arc-sine function of the input obtained from the adder 73.

The frequency of the two-phase output signal having two sinusoidal wave components $\alpha^*$ and $\beta^*$ delivered from the oscillator 52, is proportional to the magnitude of the input instruction signal $e_f$, and when the signal $e_f$ is positive, the signal component $\alpha^*$ is leading the other signal component $\beta^*$ by 90°.

The on-off switches 53 through 62 are on-off controlled by the logic outputs of the gate signal distributing circuit 8. That is, when the controlling logic signal is "1", each on-off switch is placed in an on-state.

The settings of the coefficient circuits 63 through 72 are such that the circuit 63 multiplies the input by $$\frac{1}{\sqrt{3}},$$

the circuits 64 and 65 multiply the inputs by $$\frac{-1}{2\sqrt{3}},$$

the circuit 66 by $$\frac{-1}{\sqrt{3}},$$

the circuits 67 and 68 by $$\frac{1}{2\sqrt{3}},$$

the circuit 69 by $-\frac{1}{2}$, the circuits 70 and 71 by $\frac{1}{2}$, and the circuit 72 multiplies the input by $-\frac{1}{2}$. In the above described settings, the negative factors indicate that each of the coefficient circuits having such factor is provided with a polarity reversing function.

To the input terminals of the on-off switches 53 through 58, is applied one component $\beta^*$ of the output of the oscillator 52, and to the input terminals of the on-off switches 59 through 62, is applied the other component $\alpha^*$ of the output signal of the oscillator 52. The outputs of the switches 53 through 62 are delivered through the coefficient circuits 63 through 72 to the adder circuit 73. The adder circuit 73 is connected to deliver its output to the function generating circuit 74 which delivers a phase difference $\theta$ between the phase angle indicated by the instruction signal $e_f$ and the output current vector of the inverter.

The on-off switches 53 through 62 are so connected that they are controlled by the output signals $g_1$ through $g_6$ of the gate signal distributing circuit 8, which correspond to the conducting instants of the thyristors $S_1$ through $S_6$ contained in the inverter 1. More specifically, the on-off switch 53 is controlled by the gate signal $g_1$, the on-off switches 54 and 59 are controlled by the gate signal $g_2$, the on-off switches 55 and 60 by the gate signal $g_3$, and the on-off switch 53 is controlled by the gate signal $g_4$. Likewise, the on-off switches 57 and 61 are controlled by the gate signal $g_5$, and the on-off switches 58 and 62 are controlled by the gate signal $g_6$.

Before describing the operation of the embodiment shown in FIG. 14, the fundamental principle of the control will be described at first with reference to the vector diagram of FIG. 15.

Figure 15:
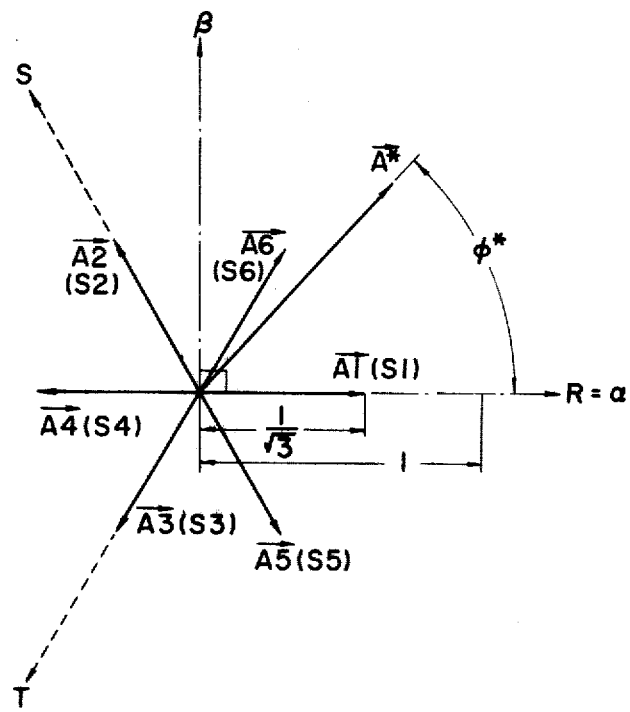
FIG. 15 is a vector diagram for explaining the operational principle of the detecting circuit shown in FIG. 14.

In FIG. 15, the positional relationship of the output current vectors shown in FIG. 2 are represented in a somewhat modified form. That is, besides the three phase axes R, S, and T, orthogonal two phase axes $\alpha$ and $\beta$ are indicated in such a manner that the R axes coincides with the $\alpha$ axis.

In the vector positions shown in FIG. 15, $\vec{A_1}$ through $\vec{A_6}$ correspond to the current vectors flowing through the thyristors $S_1$ through $S_6$ when they are conducting, and $\vec{A}^*$ represents the output vector from the oscillator 52 comprising the two-phase signal components $\alpha^*$ and $\beta^*$. The actual output current vector can be obtained as a synthesized vector of two adjacent vectors among the six vectors $\vec{A_1}$ through $\vec{A_6}$, two vectors of which are obtained from two conducting thyristors. Accordingly, a current vector $\vec{A}$ of a unit length representing the output current of the inverter at an arbitrary instant under an assumption that the conducting periods of the thyristors $S_1$ through $S_6$ are represented by the gate signals $g_1$ through $g_6$ applied thereto, can be expressed as follows.

$$\vec{A} = g_1 \cdot \vec{A_1} + g_2 \cdot \vec{A_2} + g_3 \cdot \vec{A_3} + g_4 \cdot \vec{A_4} + g_5 \cdot \vec{A_5} + g_6 \cdot \vec{A_6} \quad (4)$$

In this Equation (4), each term $g_i \cdot \vec{A_i}$ ($i=1-6$) is equal to $\vec{A_i}$ when $g_i=$"1", and equal to 0 when $g_i=$"0".

Assuming that the $\alpha$- and $\beta$-components of the vector $\vec{A}$ given by the Equation (4) are expressed by $\alpha$ and $\beta$, and that the $\alpha$- and $\beta$-axes components of the vectors $\vec{A_1}$ through $\vec{A_6}$ are obtained from the respective vector positions, then the values of $\alpha$ and $\beta$ can be expressed as follows.

$$\alpha = \frac{1}{\sqrt{3}}(g_1 - \tfrac{1}{2}g_2 - \tfrac{1}{2}g_3 - g_4 + \tfrac{1}{2}g_5 + \tfrac{1}{2}g_6) \quad (5)$$

$$\beta = \tfrac{1}{2}(g_2 - g_3 - g_5 + g_6) \quad (6)$$

whereas it is apparent that the components $\alpha^*$ and $\beta^*$ of the instruction vector A* obtained from the oscillator 52 are the $\beta$-axis component and the $\beta$-axis component of the same vector A*.

Assuming that the phase angle of the instruction vector $\vec{A}^*$ measured from the $\alpha$ axis is designated by $\phi^*$, and the phase angle of the output current vector $\vec{A}$ measured from the same axis $\alpha$ is designated by $\phi$, $\alpha$, $\beta$, $\alpha^*$, and $\beta^*$ can be expressed as $$\alpha = \cos\phi, \beta = \sin\phi$$

$$\alpha^* = \cos\phi^*, \beta^* = \sin\phi^*$$

Accordingly, the phase difference $\theta$ between the phase angles $\phi^*$ and $\phi$ of the instruction vector A* and the output current vector A can be obtained in accordance with the addition theorem as $$\sin\theta = \sin(\phi^* - \phi) = \beta^* \cdot \alpha - \alpha^* \cdot \beta \quad (7) \text{ and}$$

$$\theta = \sin^{-1}(\beta^* \cdot \alpha - \alpha^* \cdot \beta) \quad (8)$$

The embodiment shown in FIG. 14 is intended to obtain the phase angle $\theta$ in accordance with Equation (8).

In this embodiment, the components $\alpha^*$ and $\beta^*$ of the output two-phase signal from the oscillator 52 are on-off controlled by the switches 53 through 62 under the control of the gate signals $g_1$ through $g_6$ obtained from the gate signal distributing circuit 8. That is, the products of the $\alpha^*$ and one of the gate signals, and the products of the $\beta^*$ and one of the gate signals are thereby obtained, respectively. The outputs of the on-off switches 53 through 62 are passed through the coefficient circuits 63 through 72 to the adder circuit 73 where the outputs from the coefficient circuits are added together. The output of the adder circuit 73 can thus be expressed as $$\left(\frac{1}{\sqrt{3}} \cdot g_1 - \frac{1}{2\sqrt{3}} \cdot g_2 - \frac{1}{2\sqrt{3}} \cdot g_3 - \frac{1}{\sqrt{3}} \cdot g_4 + \frac{1}{2\sqrt{3}} \cdot g_5 + \frac{1}{2\sqrt{3}} \cdot g_6\right) \cdot \beta^* +$$
$$(-\tfrac{1}{2} \cdot g_2 + \tfrac{1}{2} \cdot g_3 + \tfrac{1}{2} \cdot g_5 - \tfrac{1}{2} \cdot g_6) \cdot \alpha^*$$

where $\alpha$ and $\beta$ expressed by equations (5) and (6) are substituted for the $\alpha$ and $\beta$ in Equation (7), it is apparent that the output from adder circuit 73 expressed by a formula just described is expressed by Equation (7), that is $\sin\theta$. Thus by applying the output of the adder circuit 73 to the function generating circuit 74 generating arc sine, the phase difference $\theta$ between the current vector A and the instruction vector $\vec{A}^*$ can be obtained.

When the phase difference $\theta$ obtained by the embodiment of FIG. 14 is applied to the commutation controlling circuit 20 shown in FIG. 12, an operation quite similar to those described with reference to FIGS. 8 and 12 can be realized. Furthermore, the phase difference $\theta$ is ordinarily in a range of $\pm 60°$ where the values of $\sin\theta$ and $\theta$ are approximately proportional to each other. For this reason, the function generator 74 in FIG. 14 may be omitted, and the commutation control circuit 20 may be operated directly by the $\sin\theta$ obtained from the adder circuit 73.

It is apparent that the two-phase signal axes $\alpha$ and $\beta$ in the vector diagram of FIG. 15 may be disposed at any arbitrary positions other than those shown in the drawing, and by so selecting, various modifications of the embodiment of FIG. 14 can be obtained. Also in another modification of the embodiment, the output signals $e_I$ through $e_{VI}$ of the up-down counter 7 may be used instead of the gate signals $g_1$ through $g_6$ for controlling the commutating instants of the thyristors. Alternatively, the calculation of Equation (7) may be performed in such a manner that the values of $\alpha$ and $\beta$ are obtained firstly, and then multiplied by $\beta^*$ and $\alpha^*$, respectively, utilizing two multiplying circuits.

Furthermore, in the embodiments shown in FIGS. 8 and 12, a constant deviation tends to result in the phase difference $\theta$ between the output current vector from the inverter and the instruction vector when the reference levels $\pm\theta_o$ set in the comparators 34 and 35 are somewhat erroneous. Such a deviation can be eliminated by applying an integrated value of the phase difference $\theta$ to the comparators 34 and 35. Similar effect may also be obtained by varying the time-constant of the integrating circuit 31, and by applying the output X of the integrating circuit 31 to the comparators 36 and 37 even in the case of the 120° conducting operation.

In the above described operation of the inverter 1 shown in FIG. 1, ordinarily there is a delay between the instant of applying a commutation instruction to the thyristor and the actual completion of the commutation, and therefore the output current vector of the inverter is delayed from the instructed phase position. If it is required to eliminate this delay, the outputs $e_I$ through $e_{VI}$ from the up-down counter 7 or the gating signals $g_1$ through $g_6$ from the gating signal distribution circuit 8, which are given to the phase difference detecting circuit 19 for notifying the actual turn ON time of the thyristors, may be delayed for a time interval corresponding to the aforementioned time delay. Otherwise, the circuit may be so constructed that the actually delivered output current from the inverter 1 is detected, and the detected results are given to the phase difference detecting circuit 19.

As described above, according to the present invention, the 120° conduction control and the PWM control can both be realized by a simple construction of the circuit, and the strict requirement for the commutation in the PWM mode of control can be thereby avoided. Furthermore, even in the case where the timing of the commutating instruction given from the control circuit is restricted by the commutating capability of the inverter, a predetermined ratio of pulse widths can be maintained, and when an electric motor is driven by the inverter, the torque ripple of the motor can be substantially reduced.

I claim:

1. An apparatus for controlling an inverter of the type having a plurality of switching means to be operated to produce a current vector with a specific number of stable phase positions to an AC load, said apparatus comprising:

a phase difference detecting circuit which determines a phase angle at an instant of said current vector from signals representing conductive states of said switching means in the inverter, and detects a phase difference between the phase angle thus determined and a phase angle derived from a reference signal $(e_f)$; and a commutation control circuit comprising first and second comparators for comparing said phase difference $(\theta)$ with a positive reference value $(+\theta_o)$ and a negative reference value $(-\theta_o)$ respectively, and controls the inverter so as to execute a first mode of commutation for advancing the current vector when the phase difference $(\theta)$ exceeds the positive reference value $(+\theta_o)$ and a second of commutation for reversely rotating the current vector when the phase difference $(\theta)$ is reduced below the negative reference value $(-\theta_o)$.

2. A control apparatus as set forth in claim 10 wherein said phase difference detecting circuit comprises a first transfer switch receiving said input instruction $(e_f)$ and a polarity reversed instruction signal $(-e_f)$ as its inputs, an integrating circuit for integrating the output of the first transfer switch with respect to time, a second transfer switch having two reference values $(\theta_H$ and $\theta_L)$ of different magnitudes applied to its inputs, a subtractor subtracting the output $(\theta_f)$ of said second transfer switch from the output $(\theta^*)$ of said integrating circuit, and a third transfer switch receiving the output signal of said subtractor and the polarity-reversed signal thereof as its inputs for obtaining said phase difference $(\theta)$ as its output, said first and third transfer switches being transferred each time the output $(\theta^*)$ of the integrating circuit is made equal to either of two reference values selected to be equal to the reference values $(\theta_H$ and $\theta_L)$ applied to the inputs of said second transfer switch, and said second transfer switch being transferred each time a commutating signal is applied to said inverter.

3. A controlling apparatus as set forth in claim 2 wherein said commutation control circuit comprises a first comparator for comparing the phase difference $(\theta)$ obtained from the phase difference detecting circuit with a positive reference value $(+\theta_o)$ for delivering an output "1" when the phase difference $(\theta)$ is greater than the positive reference value, a second comparator for comparing the phase difference $(\theta)$ with a negative reference value $(-\theta_o)$ for delivering an output of logic "1" when the phase difference $(\theta)$ is less than the negative reference value, an up-down counter having a specific number of output positions for controlling the phase positions of the current vector obtained from the inverter, a first pulse generating circuit connected to receive the output "1" from said first comparator for delivering a signal $(P_u)$ to said up-down counter so as to increase the count thereof, and a second pulse generating circuit connected to receive the output "1" from said second comparator for delivering a signal $(P_D)$ to said up-down counter so as to decrease the count thereof, whereby a 120° conductive mode of control can be obtained.

4. A controlling apparatus as set forth in claim 3 wherein said commutation control circuit further comprises an integrator for time-integrating the phase difference $(\theta)$, a third comparator for comparing the integrated output $(X)$ of said integrator with a first reference value $(X_H)$ and delivering an output of logic "1" when the integrated output $(X)$ is greater than the first reference value $(X_H)$, a fourth comparator for comparing the integrated output $(X)$ with a second reference value $(X_L)$ less than the first reference value $(X_H)$ for delivering an output of logic "1" when the integrated value $(X)$ is less than the second reference value $(X_L)$, a third pulse generating circuit connected to receive the output "1" from said third comparator for delivering a signal $(P_u)$ to said up-down counter so as to increase the count thereof, and a fourth pulse generating circuit connected to receive the output "1" from said forth comparator for delivering a signal $(P_D)$ to said up-down counter so as to decrease the count thereof, whereby a pulse width modulated control can be obtained.

5. A controlling apparatus as set forth in claim 1 wherein said commutation control circuit comprises a first comparator for comparing the phase difference $(\theta)$ obtained from the phase difference detecting circuit with a positive reference value for delivering an output "1" when the phase difference $(\theta)$ is greater than the positive reference value, a second comparator for comparing the phase difference $(\theta)$ with a negative reference value for delivering an output of logic "1" when the phase difference $(\theta)$ is less than the negative reference value, a first AND gate having two inputs, one of which is connected to the output of said first comparator, a second AND gate having two inputs, one of which is connected to the output of said second comparator, an up-down counter having a specific number of output positions for controlling the phase positions of the current vector obtained from the inverter, a first pulse generating circuit connected to receive the output "1" from said first AND gate for delivering a signal $(P_u)$ to said up-down counter for increasing the count thereof, a second pulse generating circuit connected to receive the output "1" from said second AND gate for delivering a signal $(P_D)$ to said up-down counter for reducing the count thereof, so that a 120° conductive mode of control can be obtained, and means for applying an inhibit signal to both of the other inputs of said first and second AND gates so as to inhibit commutation of said inverter while the same is operating with said 120° conductive mode.

6. A controlling apparatus as set forth in claim 5 wherein said commutation control circuit comprises an integrator for time-integrating the phase difference ($\theta$), a third comparator for comparing the integrated output (X) of said integrator with a first reference value and delivering an output of logic "1" when the integrated output (X) is greater than the first reference value, a fourth comparator for comparing the integrated output (X) with a second reference value ($X_L$) less than the first reference value for delivering an output of logic "1" when the integrated value (X) is less than the second reference value ($X_L$), a fifth comparator for discriminating the polarity of the phase difference ($\theta$) to deliver an output "1" when the polarity is positive, a sixth comparator for delivering an output "1" when the output of the fifth comparator is not "1", a third AND gate having three inputs, two of which inputs are connected to the outputs of said third comparator and said fifth comparator, a fourth AND gate having three inputs, two of which inputs are connected to the outputs of said fourth comparator and said sixth comparator, an up-down counter having a specific number of output positions for controlling the phase positions of the current vector obtained from the inverter, a third pulse generating circuit connected to receive the output "1" from said third AND gate for delivering a signal ($P_u$) to said up-down counter for increasing the count thereof, a fourth pulse generating circuit connected to receive the output "1" from said fourth AND gate for delivering a signal ($P_D$) to said up-down counter for reducing the count thereof, and means for applying an inhibit signal to the third inputs of said third and fourth AND gates so as to inhibit commutation of said inverter while the same is operating with said pulse width modulating mode.

7. A controlling apparatus as set forth in claim 5 or 6 wherein said means for applying an inhibit signal comprises a timer circuit which holds its output (Q) at a logic "0" for a predetermined time interval each time said signal ($P_u$ or $P_D$) is applied to said up-down counter, and the output (Q) thus delivered from said timer circuit is applied to said third inputs of said third and fourth AND gates for inhibiting commutation of said inverter for said predetermined period.

8. A controlling apparatus as set forth in claim 7 wherein said predetermined time interval is so selected that it is longer than a minimum time interval required for the completion of one commutating operation of each element of said inverter.

* * * * *